(12) United States Patent
Kang et al.

(10) Patent No.: US 9,515,987 B2
(45) Date of Patent: Dec. 6, 2016

(54) METHOD, APPARATUS, AND SYSTEM FOR NETWORK ADDRESS TRANSLATION

(71) Applicant: Huawei Technologies Co., Ltd., Shenzhen (CN)

(72) Inventors: Yudong Kang, Shenzhen (CN); Yingjie Gu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/481,149

(22) Filed: Sep. 9, 2014

(65) Prior Publication Data

US 2015/0012665 A1  Jan. 8, 2015

Related U.S. Application Data

(63) Continuation of application No. PCT/CN2012/085040, filed on Nov. 22, 2012.

(30) Foreign Application Priority Data

Apr. 26, 2012 (CN) .......................... 2012 1 0126776

(51) Int. Cl.
*H04L 29/12* (2006.01)
*G06F 9/455* (2006.01)
*H04L 29/08* (2006.01)

(52) U.S. Cl.
CPC ....... *H04L 61/2575* (2013.01); *G06F 9/45533* (2013.01); *G06F 9/45558* (2013.01);
(Continued)

(58) Field of Classification Search
USPC ............... 709/223, 227, 203, 202, 205, 212, 216,709/217, 226, 228, 229, 235, 238, 242, 243,709/245, 246, 248; 370/329, 255, 390, 401; 718/1; 726/24, 11, 22, 28, 29; 713/188; 719/313, 328; 725/39
See application file for complete search history.

(56) References Cited

U.S. PATENT DOCUMENTS 7,042,876 B1 * 5/2006 Jayasenan et al. ........... 370/389
7,155,518 B2 * 12/2006 Forslow .............. H04L 12/4641
455/461

(Continued)

FOREIGN PATENT DOCUMENTS

CN   101383757 A   3/2009
CN   101552803 A   10/2009
(Continued)

OTHER PUBLICATIONS

Foreign Communication From a Counterpart Application, PCT Application No. PCT/CN2012/085040, English Translation of International Search Report dated Feb. 28, 2013, 2 pages.
(Continued)

*Primary Examiner* — Saket K Daftuar
(74) *Attorney, Agent, or Firm* — Conley Rose, P.C.

(57) ABSTRACT

A method, an apparatus, and a system for network address translation related to the field of communications technologies. A NAT control apparatus receives a network address migration message after a first data center migrates a NAT mapping entry corresponding to a migrated virtual machine VM to a second data center, verifies the network address migration message, and updates home information of the NAT mapping entry in a network address mapping table from the first data center to the second data center according to the network address migration message. In this way, NAT address resources in each data center can be properly planned, and a release attack problem caused by a fact that applying and using of a VM are not performed in a same data center can be solved.

6 Claims, 3 Drawing Sheets

A NAT control apparatus receives a network address migration message after a first data center migrates a NAT mapping entry corresponding to a migrated VM to a second data center; and verifies the network address migration message — S101

The NAT control apparatus updates home information of the NAT mapping entry in a network address mapping table from the first data center to the second data center after successfully verifying the network address migration message — S102

(52) U.S. Cl.
CPC .. *H04L 61/2532* (2013.01); *G06F 2009/4557* (2013.01); *H04L 61/2514* (2013.01); *H04L 61/2528* (2013.01); *H04L 67/34* (2013.01)

(56) References Cited

U.S. PATENT DOCUMENTS

| | | | |
|---|---|---|---|
| 7,227,872 B1* | 6/2007 | Biswas et al. | 370/465 |
| 7,257,811 B2* | 8/2007 | Hunt et al. | 718/1 |
| 7,484,208 B1* | 1/2009 | Nelson | 718/1 |
| 7,606,191 B1* | 10/2009 | Breau | H04L 12/4641 370/328 |
| 7,680,919 B2* | 3/2010 | Nelson | 709/223 |
| 8,069,218 B1* | 11/2011 | Tormasov et al. | 709/216 |
| 8,146,082 B2* | 3/2012 | Belay | 718/1 |
| 8,458,284 B2* | 6/2013 | Huang et al. | 709/213 |
| 8,464,259 B2* | 6/2013 | Belay | 718/1 |
| 8,484,653 B2* | 7/2013 | Tsirkin | 718/104 |
| 8,533,713 B2* | 9/2013 | Dong | 718/1 |
| 8,694,644 B2* | 4/2014 | Chen et al. | 709/226 |
| 8,769,058 B1* | 7/2014 | Barker et al. | 709/220 |
| 8,826,292 B2* | 9/2014 | Heim | 718/105 |
| 8,863,141 B2* | 10/2014 | Cawlfield et al. | 718/104 |
| 8,867,403 B2* | 10/2014 | Biswas et al. | 370/254 |
| 2002/0116397 A1* | 8/2002 | Berg | H04L 29/06 |
| 2002/0116532 A1* | 8/2002 | Berg | H04L 29/06 709/246 |
| 2004/0219935 A1* | 11/2004 | McCann et al. | 455/466 |
| 2005/0013280 A1* | 1/2005 | Buddhikot et al. | 370/349 |
| 2005/0055435 A1* | 3/2005 | Gbadegesin | H04L 29/06 709/224 |
| 2005/0268298 A1* | 12/2005 | Hunt et al. | 718/1 |
| 2007/0061462 A1* | 3/2007 | Kim | H04L 29/12066 709/226 |
| 2008/0059639 A1* | 3/2008 | Zhang | 709/227 |
| 2008/0247396 A1* | 10/2008 | Hazard | H04L 12/66 370/392 |
| 2009/0276771 A1* | 11/2009 | Nickolov et al. | 717/177 |
| 2010/0115080 A1* | 5/2010 | Kageyama | H04L 29/12028 709/223 |
| 2010/0250824 A1* | 9/2010 | Belay | 711/6 |
| 2010/0287548 A1* | 11/2010 | Zhou | G06F 9/4856 718/1 |
| 2011/0019682 A1 | 1/2011 | Zhu | |
| 2011/0047256 A1* | 2/2011 | Babu et al. | 709/223 |
| 2011/0235595 A1* | 9/2011 | Mehta et al. | 370/329 |
| 2011/0246669 A1* | 10/2011 | Kanada | G06F 9/4856 709/238 |
| 2012/0005299 A1* | 1/2012 | Xu | 709/208 |
| 2012/0008528 A1* | 1/2012 | Dunbar et al. | 370/255 |
| 2012/0011254 A1* | 1/2012 | Jamjoom et al. | 709/226 |
| 2012/0096134 A1* | 4/2012 | Suit | 709/221 |
| 2012/0096171 A1* | 4/2012 | Suit | H04L 41/08 709/227 |
| 2012/0144188 A1* | 6/2012 | Agostani | H04L 63/0272 713/153 |
| 2012/0176934 A1* | 7/2012 | Farinacci et al. | 370/254 |
| 2012/0257628 A1 | 10/2012 | Bu et al. | |
| 2013/0036416 A1* | 2/2013 | Raju et al. | G06F 9/45558 718/1 |
| 2013/0044636 A1* | 2/2013 | Koponen | H04L 47/12 370/254 |
| 2013/0155902 A1* | 6/2013 | Feng et al. | H04L 67/1031 370/255 |

FOREIGN PATENT DOCUMENTS

| | | |
|---|---|---|
| CN | 101729388 A | 6/2010 |
| CN | 101765827 A | 6/2010 |
| CN | 102164091 A | 8/2011 |
| CN | 102185774 A | 9/2011 |
| CN | 102209024 A | 10/2011 |

OTHER PUBLICATIONS

Foreign Communication From a Counterpart Application, PCT Application No. PCT/CN2012/085040, Written Opinion dated Feb. 28, 2013, 4 pages.

Gu, Y., et al., "Policies and dynamic information migration in DCs," draft-gu-opsawg-policies-migration-00, Jun. 25, 2011, 32 pages.

Bifulco, R., et al., "Transparent Migration of Virtual Infrastructures in Large Datacenters for Cloud Computing," IEEE Symposium on Computers and Communications, Jun. 28, 2011, pp. 179-184.

Foreign Communication From a Counterpart Application, European Application No. 12875063.5, Extended European Search Report dated Jan. 9, 2015, 7 pages.

Srisuresh, et al., "IP Network Address Translator (NAT) Terminology and Considerations," RFC 2663, Aug. 1999, 30 pages.

Tsirtsis, et al., "Network Address Translation—Protocol (NAT-PT)," RFC 2766, Feb. 2000, 21 pages.

Foreign Communication From a Counterpart Application, Chinese Application No. 201210126776.9, Chinese Office Action dated Oct. 29, 2015, 5 pages.

* cited by examiner

METHOD, APPARATUS, AND SYSTEM FOR NETWORK ADDRESS TRANSLATION

CROSS-REFERENCE TO RELATED APPLICATIONS

This application is a continuation of International Application No. PCT/CN2012/085040, filed on Nov. 22, 2012, which claims priority to Chinese Patent Application No. 201210126776.9, filed on Apr. 26, 2012, both of which are incorporated herein by reference in their entireties.

TECHNICAL FIELD

The present application relates to the field of communications technologies, and in particular, to a method, an apparatus, and a system for network address translation.

BACKGROUND

A network address translation (NAT) technology belongs to a technology for accessing a wide area network and is a translation technology for translating a private address/port into a public address/port. It is widely applied in various network access manners and various networks.

In the prior art, as a virtualization technology is introduced, a virtual machine (VM) may be migrated among different data centers, and a NAT mapping entry that the VM has applied is migrated accordingly. For example, when a VM is migrated from a first data center to a second data center, a NAT mapping entry that the VM has applied is migrated accordingly; however, because the NAT mapping entry of the VM is used still through the first data center but the migrated VM is located in the second data center, the VM needs to perform information exchange with the first data center through the second data center when using the NAT mapping entry. In this way, the VM is prone to a release attack of an attacker. For example, when the VM is using a certain address, the attacker sends, to the first data center, a message for requesting a release of the address, which affects the VM that is using the address.

In addition, when the VM is migrated, a normal application of the VM may be affected because too many VMs are migrated to the second data center, which goes beyond planning performed by the second data center on NAT address resources.

SUMMARY

Embodiments of the present application provide a method, an apparatus, and a system for network address translation, so that a NAT control apparatus performs centralized control over each data center to properly plan NAT address resources in each data center and solve a release attack problem caused by a fact that applying and using of a VM are not performed in a same data center.

To achieve the foregoing objectives, the embodiments of the present application adopt the following technical solutions:

In one aspect, an embodiment of the present application provides a method for network address translation, which is applied in a scenario where a virtual machine is migrated across data centers and includes: receiving, by a NAT control apparatus, a network address migration message after a first data center migrates a NAT mapping entry corresponding to a migrated VM to a second data center, and verifying the network address migration message, where the network address migration message carries the NAT mapping entry, and the NAT mapping entry records a mapping between a private network address and a public network address of the VM; and updating home information of the NAT mapping entry in a network address mapping table from the first data center to the second data center according to the network address migration message, after the NAT control apparatus successfully verifies the network address migration message, where the network address mapping table is used to record the NAT mapping entry and the home information of the NAT mapping entry.

In another aspect, an embodiment of the present application provides a NAT control apparatus, which is applied in a scenario where a virtual machine is migrated across data centers and includes: a migration message receiving unit configured to receive a network address migration message after a first data center migrates a NAT mapping entry corresponding to a migrated VM to a second data center, where the network address migration message carries the NAT mapping entry, and the NAT mapping entry records a mapping between a private network address and a public network address of the VM; a verifying unit configured to verify the network address migration message; and an updating unit configured to update home information of the NAT mapping entry in a network address mapping table from the first data center to the second data center according to the network address migration message after the verifying unit successfully verifies the network address migration message, where the network address mapping table is used to record the NAT mapping entry and the home information of the NAT mapping entry.

In another aspect, an embodiment of the present application provides a system for network address translation, which is applied in a scenario where a virtual machine is migrated across data centers and includes a NAT control apparatus, a first data center, and a second data center, wherein the first data center is configured to migrate a NAT mapping entry corresponding to a migrated VM to the second data center; the NAT control apparatus is the foregoing NAT control apparatus; and the second data center is configured to receive the NAT mapping entry.

According to the method, the apparatus, and the system for network address translation that are provided in the embodiments of the present application, a NAT control apparatus performs centralized control over each data center to properly plan NAT address resources in each data center; meanwhile, the NAT control apparatus records home information of a NAT mapping entry corresponding to the VM, thereby solving a release attack problem caused by a fact that applying and using of the VM are not performed in a same data center.

BRIEF DESCRIPTION OF DRAWINGS

To describe the technical solutions in the embodiments of the present application more clearly, the following briefly introduces the accompanying drawings needed for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. The embodiments to be described are merely a part rather than all of the embodiments of the present application. All other embodiments obtained by a person of ordinary skill in the art based on the embodiments of the present application without creative efforts shall fall within the protection scope of the present application.

Figure 1:
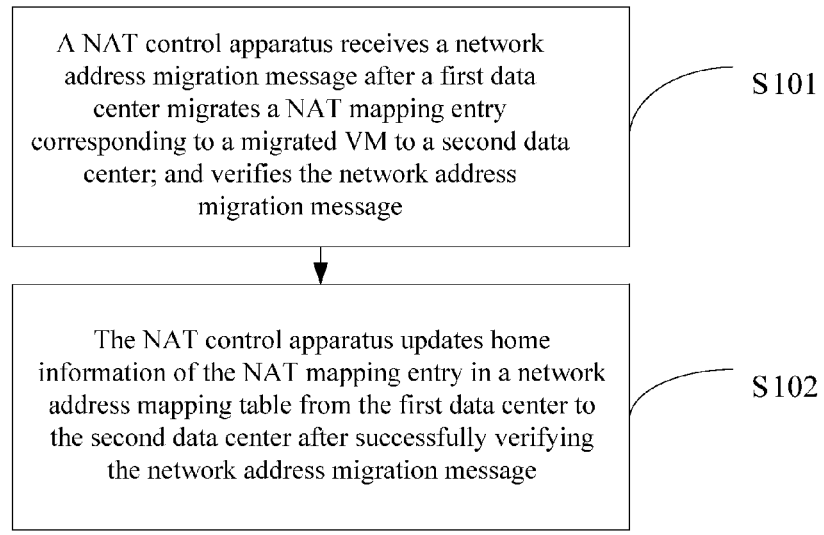
FIG. 1 is a schematic diagram of a method for network address translation according to an embodiment of the present application.

An embodiment of the present application provides a method for network address translation, and as shown in FIG. 1, the method is applied in a scenario where a VM is migrated across data centers. The method is executed by a NAT control apparatus and includes the following steps:

S101. The NAT control apparatus receives a network address migration message after a first data center migrates a NAT mapping entry corresponding to a migrated VM to a second data center; and verifies the network address migration message.

The following three cases where the VM is migrated from the first data center to the second data center mainly exist:

Case 1: An operator triggers migration of the VM from the first data center to the second data center by using a graphical user interface (GUI); a VCenter informs a network center (NCenter) that the VM has been migrated from the first data center to the second data center; and the NCenter triggers migration of the NAT mapping entry, where the VCenter is used to manage and monitor the VM, and the NCenter is used to manage the data centers (including the first data center and the second data center).

Case 2: When an exception (for example, a breakdown) occurs to the first data center, migration of the VM from the first data center to the second data center is triggered; a VCenter informs an NCenter that the VM has been migrated from the first data center to the second data center; and the NCenter triggers migration of the NAT mapping entry.

Case 3: A VCenter learns, through calculation, that a load of the first data center is relatively heavy, and triggers migration of the VM in the first data center from the first data center to the second data center; the VCenter informs an NCenter that the VM has been migrated from the first data center to the second data center; and the NCenter triggers migration of the NAT mapping entry.

That the first data center migrates the NAT mapping entry corresponding to the migrated VM to the second data center may be as follows: an NCenter triggers a gateway of the first data center to migrate the NAT mapping entry corresponding to the migrated VM to a gateway of the second data center.

The network address migration message carries the NAT mapping entry, and the NAT mapping entry records a mapping between a private network address and a public network address of the VM, where the private network address can be used only on a local area network and cannot be used on a wide area network, and the public network address can be used on a wide area network and can also be used on a local area network. Therefore, when the VM accesses a wide area network from a local area network, a private network address of a packet that is sent by the VM needs to be translated into a public network address.

Exemplarily, the NAT control apparatus may receive the network address migration message sent by the first data center and verify the network address migration message with the second data center. In an embodiment, after receiving the network address migration message, the NAT control apparatus sends a verification request message to the second data center, and the second data center sends a verification response message to the NAT control apparatus after confirming that the NAT mapping entry has been migrated to the second data center. After the NAT control apparatus updates home information of the NAT mapping entry in a network address mapping table from the first data center to the second data center according to the network address migration message, the NAT control apparatus sends a migration confirmation message to the first data center to confirm that migration of the NAT mapping entry is completed.

Exemplarily, the NAT control apparatus may receive the network address migration message sent by the second data center and verify the network address migration message with the first data center. In an embodiment, after receiving the network address migration message, the NAT control apparatus sends a verification request message to the first data center, and the first data center sends a verification response message to the NAT control apparatus after confirming that the NAT mapping entry has been migrated out of the first data center. After the NAT control apparatus updates home information of the NAT mapping entry in a network address mapping table from the first data center to the second data center according to the network address migration message, the NAT control apparatus sends a migration confirmation message to the second data center to confirm that migration of the NAT mapping entry is completed.

It should be noted that a mechanism that the NAT control apparatus receives the network address migration message (the NAT control apparatus receives the network address migration message from the first data center or from the second data center) is preset in a whole system for network address translation.

In an embodiment, that the first data center migrates the NAT mapping entry corresponding to the migrated VM to the second data center may be as follows: the first data center sends the NAT mapping entry to the second data center and deletes the NAT mapping entry, and the second data center adds the NAT mapping entry.

Further, when the VM accesses a wide area network from a local area network and in a case where the first data center receives a first packet sent by the VM, a private network address of the packet needs to be translated into a corresponding public network address, and the NAT control apparatus allocates the corresponding public network address for the private network address of the packet. In this case, the method further includes:

After the first data center receives a first packet that carries a private network address and is sent by the VM, the NAT control apparatus receives a NAT request message sent by the first data center, wherein the NAT request message carries the private network address of the first packet sent by the VM; the NAT control apparatus allocates a public network address for the private network address according to the NAT request message, establishes the NAT mapping entry according to the private network address and the public network address, records the NAT mapping entry in the network address mapping table, and records the home information of the NAT mapping entry as the first data center, wherein one NAT mapping entry corresponds to one VM; and the NAT control apparatus sends the NAT mapping entry to the first data center, so that after storing the NAT mapping entry, the first data center translates, according to the NAT mapping entry, private network addresses of packets (including the first packet and a subsequent packet sent by the VM) sent by the VM into public network addresses.

In addition, the first data center may set a second timer for the NAT mapping entry, and the second timer records a preset time. In a case where the VM does not send or receive a packet in a certain subsequent moment, the second timer starts when the first data center does not detect a session connection corresponding to the NAT mapping entry, and stops when the preset time is reached or expires. When the second timer reaches or exceeds the preset time, it indicates that the VM has not sent or received a packet for a long time, and the NAT mapping entry corresponding to the VM is released in time, thereby saving system resources. Further, if the first data center receives a session connection corresponding to the NAT mapping entry again within the preset time, the second timer is reset.

S102. The NAT control apparatus updates home information of the NAT mapping entry in a network address mapping table from the first data center to the second data center after successfully verifying the network address migration message.

The network address mapping table records the NAT mapping entry and the home information of the NAT mapping entry.

The home information of the NAT mapping entry is updated from the first data center to the second data center; in other words, the updated NAT mapping entry is homed in the second data center.

Further, after the VM is migrated from the first data center to the second data center and when the second data center does not receive a session connection corresponding to the NAT mapping entry, the method further includes releasing the NAT mapping entry. A process for releasing the NAT mapping entry is as follows:

Receive a release request message that is sent by the second data center when a first timer corresponding to the NAT mapping entry reaches or exceeds a preset time, where the release request message carries the NAT mapping entry; and when it is determined that the home information of the NAT mapping entry is the second data center, where the home information of the NAT mapping entry is recorded in the network address mapping table, send a release response message to the second data center, so that the second data center deletes the NAT mapping entry.

The first timer records the preset time. In a case where the VM does not send or receive a packet in a certain subsequent moment, the first timer starts when the second data center does not detect a session connection corresponding to the NAT mapping entry, and stops when the preset time is reached or expires. When the first timer reaches or exceeds the preset time, it indicates that the VM has not sent or received a packet for a long time, and the NAT mapping entry corresponding to the VM is released in time, thereby saving system resources.

In addition, if the second data center receives a session connection corresponding to the NAT mapping table again within the preset time, the first timer is reset.

It should be noted that the preset time is concurrently sent to the second data center when the first data center migrates the NAT mapping entry corresponding to the migrated VM to the second data center; in addition, when the VM is migrated from the first data center to the second data center, recorded time of the preset time before the migration is recorded as a first preset time, and a time remaining after the first preset time period is subtracted from the preset time is recorded as a second preset time period. Therefore, the concurrently sending the preset time to the second data center when the first data center migrates the NAT mapping entry corresponding to the migrated VM to the second data center is as follows: concurrently sending the preset time, and the first preset time and/or the second preset time to the second data center when the first data center migrates the NAT mapping entry corresponding to the migrated VM to the second data center. For example, if the preset time recorded by the second timer is 60 s, and 20 s of the preset time has been recorded before the VM is migrated, the second timer stops recording the preset time in a migration process, and the preset time of 60 s and subsequently unrecorded preset time of 40 s are sent to the first timer of the second data center (or the preset time of 60 s and the recorded preset time of 20 s may be sent to the first timer of the second data center, or the preset time of 60 s, the recorded preset time of 20 s, and subsequently unrecorded preset time of 40 s may be sent to the first timer of the second data center); the first timer starts recording from 40 s of the preset time; and when the second data center sends or receives a session connection corresponding to the NAT mapping entry, the first timer is reset to 60 s.

When it is determined that the home information of the unused NAT mapping entry is the second data center, where the home information of the NAT mapping entry is recorded in the network address mapping table, the NAT control apparatus sends a release response message to the second data center, so that the second data center deletes the NAT mapping entry.

In the foregoing embodiment of the present application, actions of the first data center may be executed by the gateway of the first data center, and actions of the second data center may be executed by the gateway of the second data center.

It should be noted that the private network address in the foregoing embodiment may be a private Internet Protocol (IP) address, or a private IP address and a private port number, and the public network address may be a public IP address, or a public IP address and a public port number.

According to the method in the foregoing embodiment, a NAT control apparatus performs centralized control over each data center to properly plan NAT address resources in each data center; meanwhile, the NAT control apparatus records home information of a NAT mapping entry corresponding to the VM, thereby solving a release attack problem caused by a fact that applying and using of the VM are not performed in a same data center.

Figure 2:
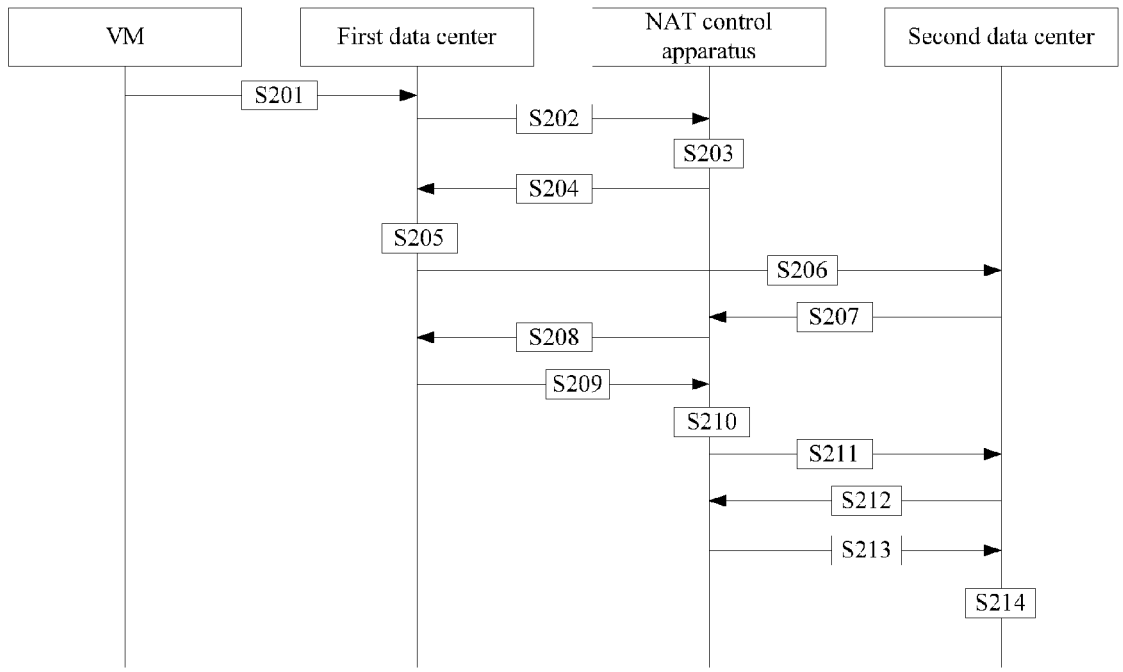
FIG. 2 is a schematic flowchart of a method for network address translation according to an embodiment of the present application.

An embodiment of the present application provides a method for network address translation, and as shown in FIG. 2, the method is applied in a scenario where a virtual machine VM is migrated across data centers and includes the following steps:

S201. A first data center receives a first packet that carries a private network address and is sent by a VM.

S202. The first data center sends a NAT request message to a NAT control apparatus.

The NAT request message carries the private network address of the first packet sent by the VM.

S203. The NAT control apparatus allocates a public network address for the private network address according to the NAT request message, establishes a NAT mapping entry according to the private network address and the public network address, records the NAT mapping entry in a network address mapping table, and records home information of the NAT mapping entry as the first data center.

The NAT mapping entry records a mapping between the private network address and the public network address, and one NAT mapping entry corresponds to one VM, where the private network address is an address specially used on a local area network and cannot be used on a wide area network, and the public network address can be used on a wide area network and can also be used on a local area network.

S204. The NAT control apparatus sends the NAT mapping entry to the first data center.

S205. The first data center stores the NAT mapping entry and translates, according to the NAT mapping entry, the private network address of the packet sent by the VM into the public network address.

Further, the first data center may set a second timer for the NAT mapping entry, and the second timer records a preset time. In a case where the VM does not send or receive a packet in a certain subsequent moment, the second timer starts when the first data center does not detect a session connection corresponding to the NAT mapping entry, and stops when the preset time is reached or expires. When the second timer reaches or exceeds the preset time, it indicates that the VM has not sent or received a packet for a long time, and the NAT mapping entry is released in time, thereby saving system resources.

In addition, if the first data center receives a session connection corresponding to the NAT mapping table again within the preset time, the second timer is reset.

It should be noted that in step S201 to step S205, a process that the NAT control apparatus allocates the NAT mapping entry for the first packet sent by the VM and received by the first data center is described. An NAT mapping entry does not need to be allocated again for a packet that is subsequently sent by the VM and received by the NAT control apparatus, and the NAT mapping entry is directly used for the packet that is subsequently sent by the VM.

When the VM is migrated from the first data center to a second data center, this embodiment further includes the following steps:

S206. The first data center migrates the NAT mapping entry corresponding to the migrated VM to the second data center.

For a detailed migration process, reference may be made to the description in S101.

S207. The NAT control apparatus receives a network address migration message sent by the second data center.

The network address migration message carries the NAT mapping entry.

Exemplarily, the NAT control apparatus may also receive a network address migration message sent by the first data center.

It should be noted that a mechanism that the NAT control apparatus receives the network address migration message (the NAT control apparatus receives the network address migration message from the first data center or from the second data center) is preset in a whole system for network address translation.

S208. The NAT control apparatus sends a verification request message to the first data center.

Exemplarily, if the NAT control apparatus receives the network address migration message sent by the first data center, step S208 is that the NAT control apparatus sends a verification request message to the second data center.

The verification request message carries the NAT mapping entry.

S209. The first data center sends a verification response message to the NAT control apparatus after confirming that the NAT mapping entry is migrated out of the first data center.

Exemplarily, if the NAT control apparatus receives the network address migration message sent by the first data center, step S209 is that the second data center sends a verification response message to the NAT control apparatus after confirming that the NAT mapping entry is migrated to the second data center.

S210. The NAT control apparatus updates home information of the NAT mapping entry in a network address mapping table from the first data center to the second data center according to the network address migration message.

The network address mapping table records the NAT mapping entry and the home information of the NAT mapping entry, and the home information of the NAT mapping entry is updated from the first data center to the second data center, in other words, the updated NAT mapping table is homed in the second data center. For details, reference may be made to the description in step S102.

S211. The NAT control apparatus sends a migration confirmation message to the second data center to confirm that migration of the NAT mapping entry is completed.

Exemplarily, if the NAT control apparatus receives the network address migration message sent by the first data center, step S211 is that the NAT control apparatus sends a migration confirmation message to the first data center to confirm that migration of the NAT mapping entry is completed.

After the VM is migrated from the first data center to the second data center and when the second data center does not receive a session connection corresponding to the NAT mapping entry, the second data center needs to release the NAT mapping entry, and this step includes:

S212. The NAT control apparatus receives a release request message that is sent by the second data center when a first timer corresponding to the NAT mapping entry reaches or exceeds a preset time.

The release request message carries the NAT mapping entry.

The first timer records the preset time. In a case where the VM does not send or receive a packet in a certain subsequent moment, the first timer starts when the second data center does not detect a session connection corresponding to the NAT mapping entry, and stops when the preset time is reached or expires. When the first timer reaches or exceeds the preset time, it indicates that the VM has not sent or received a packet for a long time, and the NAT mapping entry is released in time, thereby saving system resources.

In addition, if the second data center receives a session connection corresponding to the NAT mapping table again within the preset time, the first timer is reset.

It should be noted that the preset time is concurrently sent to the second data center when the first data center migrates the NAT mapping entry corresponding to the migrated VM to the second data center; in addition, when the VM is migrated from the first data center to the second data center, recorded time of the preset time before the migration is recorded as a first preset time period, and a time remaining after the first preset time period is subtracted from the preset time is recorded as a second preset time period. Therefore, the concurrently sending the preset time to the second data center when the first data center migrates the NAT mapping entry corresponding to the migrated VM to the second data center is as follows: concurrently sending the preset time, and the first preset time and/or the second preset time to the second data center when the first data center migrates the NAT mapping entry corresponding to the migrated VM to the second data center. For example, if the preset time recorded by the second timer is 60 s, and 20 s of the preset time has been recorded before the VM is migrated, the second timer stops recording the preset time in a migration process, and the preset time of 60 s and subsequently unrecorded preset time of 40 s are sent to the first timer of the second data center (or the preset time of 60 s and the recorded preset time of 20 s may be sent to the first timer of the second data center, or the preset time of 60 s, the recorded preset time of 20 s, and subsequently unrecorded preset time of 40 s may be sent to the first timer of the second data center); the first timer starts recording from 40 s of the preset time; and when the second data center sends or receives a session connection corresponding to the NAT mapping entry, the first timer is reset to 60 s.

S213. When it is determined that the home information of the NAT mapping entry is the second data center, where the home information of the NAT mapping entry is recorded in the network address mapping table, the NAT control apparatus sends a release response message to the second data center.

S214. The second data center deletes the NAT mapping entry after receiving the release response message.

It should be noted that the private network address in the foregoing embodiment may be a private IP address, or a private IP address and a private port number, and the public network address may be a public IP address, or a public IP address and a public port number.

In the foregoing embodiment of the present application, actions of the first data center may be executed by a gateway of the first data center, and actions of the second data center may be executed by a gateway of the second data center.

According to the method in the foregoing embodiment, a NAT control apparatus performs centralized control over each data center to properly plan NAT address resources in each data center; meanwhile, the NAT control apparatus records home information of a NAT mapping entry corresponding to the VM, thereby solving a release attack problem caused by a fact that applying and using of the VM are not performed in a same data center.

Figure 3:
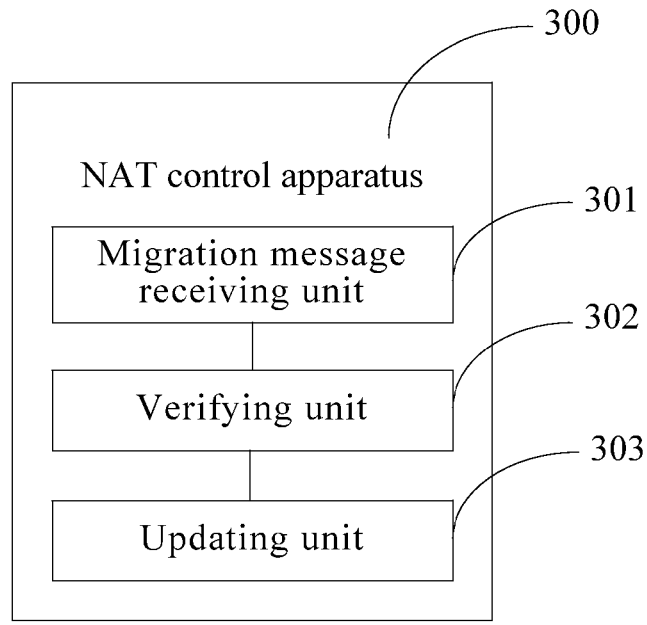
FIG. 3 is a schematic structural diagram of a NAT control apparatus according to an embodiment of the present application.

An embodiment of the present application provides a NAT control apparatus 300 configured to implement the foregoing methods in the present application, and as shown in FIG. 3, the apparatus is applied in a scenario where a virtual machine VM is migrated across data centers and includes:

A migration message receiving unit 301 is configured to receive a network address migration message after a first data center migrates a NAT mapping entry corresponding to a migrated virtual machine to a second data center;

The following three cases where the VM is migrated from the first data center to the second data center mainly exist:

Case 1: An operator triggers migration of the VM from the first data center to the second data center by using a GUI; a VCenter informs a NCenter that the VM has been migrated from the first data center to the second data center; and the NCenter triggers migration of the NAT mapping entry, where the VCenter is used to manage and monitor the VM, and the NCenter is used to manage the data centers (including the first data center and the second data center).

Case 2: When an exception (for example, a breakdown) occurs to the first data center, migration of the VM from the first data center to the second data center is triggered; a VCenter informs an NCenter that the VM has been migrated from the first data center to the second data center; and the NCenter triggers migration of the NAT mapping entry.

Case 3: A VCenter learns, through calculation, that a load of the first data center is relatively heavy, and triggers migration of the VM in the first data center from the first data center to the second data center; the VCenter informs an NCenter that the VM has been migrated from the first data center to the second data center; and the NCenter triggers migration of the NAT mapping entry.

That the first data center migrates the NAT mapping entry corresponding to the migrated VM to the second data center may be as follows: an NCenter triggers a gateway of the first data center to migrate the NAT mapping entry corresponding to the migrated VM to a gateway of the second data center.

The network address migration message carries the NAT mapping entry, and the NAT mapping entry records a mapping between a private network address and a public network address of the VM, where the private network address can be used only on a local area network and cannot be used on a wide area network, and the public network address can be used on a wide area network and can also be used on a local area network. Therefore, when the VM accesses a wide area network from a local area network, a private network address of a packet that is sent by the VM needs to be translated into a public network address.

A verifying unit 302 is configured to verify the network address migration message.

An updating unit 303 is configured to update home information of the NAT mapping entry in a network address mapping table from the first data center to the second data center after the verifying unit 302 successfully verifies the network address migration message.

The network address mapping table is used to record the NAT mapping entry and the home information of the NAT mapping entry.

The home information of the NAT mapping entry is updated from the first data center to the second data center, in other words, the updated NAT mapping entry is homed in the second data center.

Exemplarily, the migration message receiving unit 301 is configured to, after the first data center migrates the NAT mapping entry corresponding to the migrated VM to the second data center, receive the network address migration message sent by the first data center; and the verifying unit 302 is configured to verify the network address migration message with the second data center.

Exemplarily, the migration message receiving unit 301 is configured to, after the first data center migrates the NAT mapping entry corresponding to the migrated VM to the second data center, receive the network address migration message sent by the second data center; and the verifying unit 302 is configured to verify the network address migration message with the first data center.

It should be noted that a mechanism that the NAT control apparatus receives the network address migration message (the NAT control apparatus receives the network address migration message from the first data center or from the second data center) is preset in a whole system for network address translation.

Figure 4:
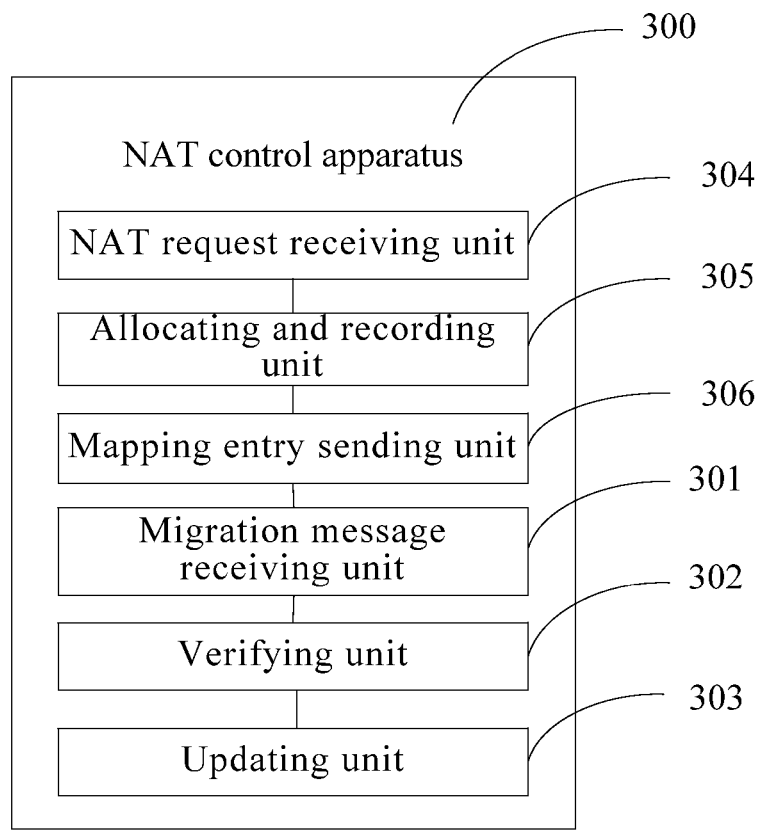
FIG. 4 is a schematic structural diagram of another NAT control apparatus according to an embodiment of the present application.

Further, as shown in FIG. 4, the NAT control apparatus 300 includes:

A NAT request receiving unit 304 is configured to, after the first data center receives a first packet that carries a private network address and is sent by the VM, receive a NAT request message sent by the first data center.

The NAT request message carries the private network address of the first packet sent by the VM.

An allocating and recording unit 305 is configured to allocate a public network address for the private network address according to the NAT request message, establish the NAT mapping entry according to the private network address and the public network address, record the NAT mapping entry in the network address mapping table, and record the home information of the NAT mapping entry as the first data center.

One NAT mapping entry corresponds to one VM.

A mapping entry sending unit 306 is configured to send the NAT mapping entry to the first data center, so that after storing the NAT mapping entry, the first data center translates, according to the NAT mapping entry, private network addresses of packets (including the first packet and a subsequent packet sent by the VM) sent by the VM into public network addresses.

Figure 5:
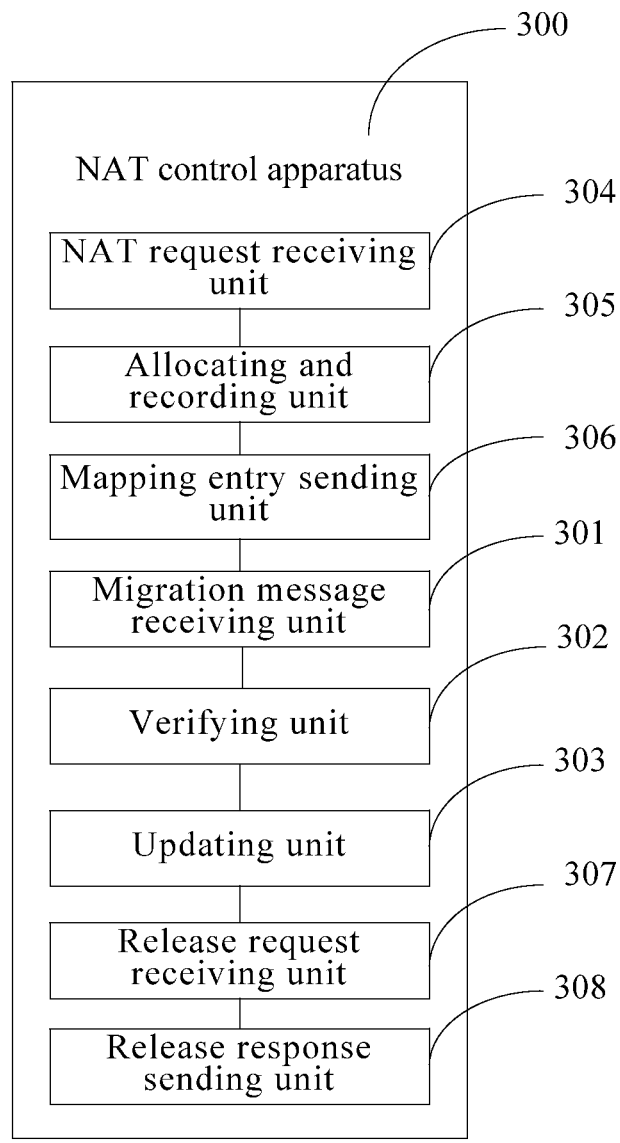
FIG. 5 is a schematic structural diagram of another NAT control apparatus according to an embodiment of the present application.

Further, as shown in FIG. 5, the NAT control apparatus 300 includes:

A release request receiving unit 307 is configured to, after the updating unit 303 updates the home information of the NAT mapping entry in the network address mapping table from the first data center to the second data center according to the network address migration message, receive a release request message that is sent by the second data center when a first timer corresponding to the NAT mapping entry reaches or exceeds a preset time.

The release request message carries the NAT mapping entry.

The first timer records the preset time. In a case where the VM does not send or receive a packet in a certain subsequent moment, the first timer starts when the second data center does not detect a session connection corresponding to the NAT mapping entry, and stops when the preset time is reached or expires. When the first timer reaches or exceeds the preset time, it indicates that the VM has not sent or received a packet for a long time, and the NAT mapping entry corresponding to the VM is released in time, thereby saving system resources;

In addition, if the second data center receives a session connection corresponding to the NAT mapping table again within the preset time, the first timer is reset.

A release response sending unit 308 is configured to, when it is determined that the home information of the NAT mapping entry is the second data center, where the home information of the NAT mapping entry is recorded in the network address mapping table, send a release response message to the second data center, so that the second data center deletes the NAT mapping entry.

In the foregoing embodiment of the present application, actions of the first data center may be executed by the gateway of the first data center, and actions of the second data center may be executed by the gateway of the second data center.

It should be noted that the private network address in the foregoing embodiment may be a private IP address, or a private IP address and a private port number, and the public network address may be a public IP address, or a public IP address and a public port number.

According to the NAT control apparatus in the foregoing embodiment, the NAT control apparatus performs centralized control over each data center to properly plan NAT address resources in each data center; meanwhile, the NAT control apparatus records home information of a NAT mapping entry corresponding to the VM, thereby solving a release attack problem caused by a fact that applying and using of the VM are not performed in a same data center.

Figure 6:
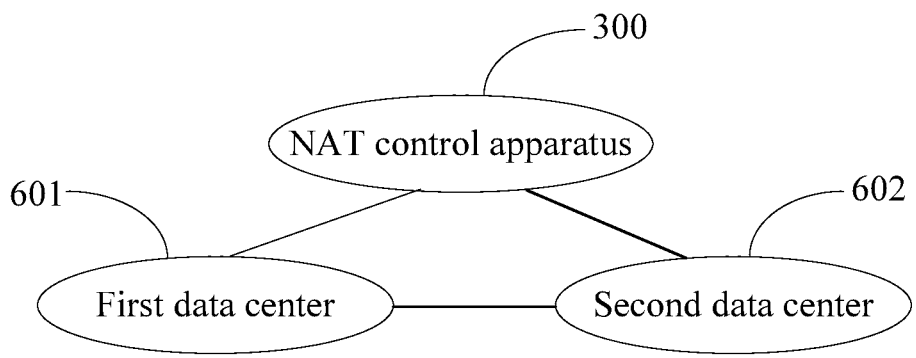
FIG. 6 is a schematic diagram of a system for network address translation according to an embodiment of the present application.

An embodiment of the present application provides a system for network address translation, and as shown in FIG. 6, the system is applied in a scenario where a virtual machine VM is migrated across data centers and includes a NAT control apparatus 300, a first data center 601, and a second data center 602.

The first data center 601 is configured to migrate a NAT mapping entry corresponding to a migrated VM to the second data center 602.

The NAT control apparatus is the NAT control apparatus 300 described in the foregoing embodiments.

The second data center 602 is configured to receive the NAT mapping entry.

In the foregoing embodiment of the present application, actions of the first data center may be executed by a gateway of the first data center, and actions of the second data center may be executed by a gateway of the second data center.

It should be noted that the NAT control apparatus 300 is applied in the foregoing methods for network address translation, and each unit in the apparatus also corresponds to each step in the methods.

According to the system for network address translation in the foregoing embodiment, the NAT control apparatus performs centralized control over each data center to properly plan NAT address resources in each data center; meanwhile, the NAT control apparatus records home information of a NAT mapping entry corresponding to the VM, thereby solving a release attack problem caused by a fact that applying and using of the VM are not performed in a same data center.

A person of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes: any medium that can store program code, such as a read only memory (ROM), a random access memory (RAM), a magnetic disk, or an optical disc.

The foregoing descriptions are merely specific embodiments of the present application, but are not intended to limit the protection scope of the present application. Any variation or replacement that may be readily figured out by a person skilled in the art within the technical scope disclosed in the present application shall all fall within the protection scope of the present application. Therefore, the protection scope of the present application shall be subject to the protection scope of the claims.

What is claimed is:

1. A method for network address translation (NAT), applied in a scenario where a virtual machine (VM) is migrated from a first data center to a second data center, and performed by a NAT control apparatus, wherein the NAT control apparatus is a device that performs centralized control over the first data center and the second data center, wherein the method comprises:

receiving a network address migration message from a first gateway of the first data center, wherein the network address migration message notifies the NAT control apparatus that a NAT mapping entry corresponding to the VM has been migrated from the first gateway of the first data center to a second gateway of the second data center, wherein the network address migration message carries the NAT mapping entry, and wherein the NAT mapping entry records a mapping between a private network address and a public network address of the VM;

sending a verification request message to the second gateway to verify whether the NAT mapping entry has been migrated from the first gateway to the second gateway according to the network address migration message;

receiving a verification response message from the second gateway, wherein the verification response message is used to confirm that the NAT mapping entry has been migrated to the second gateway;

updating, home information of the NAT mapping entry in a network address mapping table from the first data center to the second data center according to the verification response message, wherein the network address mapping table is used to record the NAT mapping entry and the home information of the NAT mapping entry;

receiving a release request message from the second gateway when a first timer corresponding to the NAT mapping entry reaches or exceeds a preset time after updating the home information of the NAT mapping entry in the network address mapping table, wherein the release request message comprises the NAT mapping entry; and sending a release response message to the second gateway, wherein the second gateway deletes the NAT mapping entry when the home information of the NAT mapping entry is the second data center, and wherein the information of the NAT mapping entry is recorded in the network address mapping table.

2. The method according to claim 1, the method further comprises:

receiving a NAT request message from the first gateway after the first gateway receives a first packet that is from the VM, wherein the NAT request message comprises a private network address of the VM;

allocating a public network address for the private network address according to the NAT request message;

establishing the NAT mapping entry according to the private network address and the public network address;

recording the NAT mapping entry in the network address mapping table;

recording the home information of the NAT mapping entry as the first data center; and sending the NAT mapping entry to the first gateway, wherein the first gateway translates, according to the NAT mapping entry, the private network address of a packet from the VM into the public network address after storing the NAT mapping entry.

3. A network address translation (NAT) control apparatus applied in a scenario where a virtual machine (VM) is migrated from a first data center to a second data center, wherein the NAT control apparatus performs centralized control over the first data center and the second data center, and wherein the NAT control apparatus comprises:

a receiver;

a memory; and a processor coupled to the memory and the receiver, wherein a program is stored in the memory and comprises instructions for execution by the processor, wherein the receiver is configured to receive a network address migration message from a first gateway of the first data center, wherein the network address migration message notifies the NAT control apparatus that a NAT mapping entry corresponding to the VM has been migrated from the first gateway of the first data center to a second gateway of the second data center, wherein the network address migration message carries the NAT mapping entry, wherein the NAT mapping entry records a mapping between a private network address and a public network address of the VM, wherein the instructions cause the processor to:
    send a verification request message to the second gateway to verify whether the NAT mapping entry has been migrated from the first gateway to the second gateway according to the network address migration message;
    receive a verification response message from the second gateway, wherein the verification response message is used to confirm that the NAT mapping entry has been migrated to the second gateway; and
    update home information of the NAT mapping entry in a network address mapping table in the memory from the first data center to the second data center according to the verification response message, wherein the network address mapping table is used to record the NAT mapping entry and the home information of the NAT mapping entry, wherein the receiver is further configured to receive a release request message from the second gateway when a first timer corresponding to the NAT mapping entry reaches or exceeds a preset time after updating the home information of the NAT mapping entry in the network address mapping table from the first data center to the second data center according to the verification response message, wherein the release request message carries the NAT mapping entry, and wherein the instructions further cause the processor to send a release response message to the second gateway.

4. The apparatus according to claim 3, wherein the receiver is further configured to receive a NAT request message from the first gateway after the first gateway receives a first packet from the VM, wherein the NAT request message comprises a private network address of the VM, wherein the instructions further cause the processor to:

allocate a public network address for the private network address according to the NAT request message;

establish the NAT mapping entry according to the private network address and the public network address;

record the NAT mapping entry in the network address mapping table;

record the home information of the NAT mapping entry as the first data center; and send the NAT mapping entry to the first gateway.

5. A network address translation (NAT) control apparatus applied in a scenario where a virtual machine (VM) is migrated from a first data center to a second data center, wherein the NAT control apparatus performs centralized control over the first data center and the second data center, wherein the NAT control apparatus comprises:

a receiver;
a memory; and
a processor coupled to the memory and the receiver,
wherein a program is stored in the memory and comprises instructions for execution by the processor,
wherein the receiver is configured to receive a network address migration message from a second gateway of the second data center,
wherein the network address migration message notifies the NAT control apparatus that a NAT mapping entry corresponding to the VM has been migrated from a first gateway of the first data center to the second gateway of the second data center,
wherein the network address migration message carries the NAT mapping entry,
wherein the NAT mapping entry records a mapping between a private network address and a public network address of the VM,
wherein the instructions cause the processor to:
- send a verification request message to the first gateway to verify whether the NAT mapping entry has been migrated from the first gateway to the second gateway according to the network address migration message;
- receive a verification response message from the first gateway, wherein the verification response message is used to confirm that the NAT mapping entry has been migrated to the second gateway; and
- update home information of the NAT mapping entry in a network address mapping table in the memory from the first data center to the second data center according to the verification response message, wherein the network address mapping table is used to record the NAT mapping entry and the home information of the NAT mapping entry,
wherein the receiver is further configured to receive a release request message from the second gateway when a first timer corresponding to the NAT mapping entry reaches or exceeds a preset time after the updating the home information of the NAT mapping entry in the network address mapping table from the first data center to the second data center according to the verification response message,
wherein the release request message carries the NAT mapping entry, and
wherein the instructions further cause the processor to send a release response message to the second gateway.

6. The apparatus according to claim 5, wherein the receiver is further configured to receive a NAT request message from the first gateway after the first gateway receives a first packet from the VM, wherein the NAT request message comprises a private network address of the VM, wherein the instructions further cause the processor to:
- allocate a public network address for the private network address according to the NAT request message;
- establish the NAT mapping entry according to the private network address and the public network address;
- record the NAT mapping entry in the network address mapping table;
- record the home information of the NAT mapping entry as the first data center; and
- send the NAT mapping entry to the first gateway.

* * * * *